United States Patent
Zhang et al.

(10) Patent No.: US 12,195,373 B2
(45) Date of Patent: Jan. 14, 2025

(54) POLYZIRCONIUM COAGULANT AND APPLICATION THEREOF

(71) Applicant: Nanjing University, Nanjing (CN)

(72) Inventors: Shujuan Zhang, Nanjing (CN); Yonghai Gan, Nanjing (CN); Yanying Chen, Nanjing (CN); Zhihao Hang, Nanjing (CN); Bingcai Pan, Nanjing (CN)

(73) Assignee: Nanjing University, Nanjing (CN)

( * ) Notice: Subject to any disclaimer, the term of this patent is extended or adjusted under 35 U.S.C. 154(b) by 0 days.

(21) Appl. No.: 18/177,152

(22) Filed: Mar. 2, 2023

(65) Prior Publication Data
US 2023/0278898 A1    Sep. 7, 2023

(30) Foreign Application Priority Data

Mar. 3, 2022 (CN) .......................... 202210203422.3

(51) Int. Cl.
*C02F 1/52* (2023.01)
*C02F 101/10* (2006.01)
(Continued)

(52) U.S. Cl.
CPC ...... *C02F 1/5236* (2013.01); *C02F 2101/105* (2013.01); *C02F 2101/14* (2013.01); *C02F 2101/30* (2013.01)

(58) Field of Classification Search
None
See application file for complete search history.

(56) References Cited

U.S. PATENT DOCUMENTS

| 4,134,831 A * | 1/1979 | Dawson | B01J 47/016 |
| | | | 210/683 |
| 2016/0347631 A1* | 12/2016 | Dong | B01D 61/145 |
| 2021/0032114 A1 | 2/2021 | Li et al. | |

FOREIGN PATENT DOCUMENTS

| CN | 107151030 A | 9/2017 |
| CN | 108128864 A | 6/2018 |

(Continued)

OTHER PUBLICATIONS

Lakshmanan et al. (2008) Arsenic removal by coagulation with aluminum, iron, titanium, and zirconium[J]. Journal American Water Works Association 100, 76 88.
(Continued)

*Primary Examiner* — Peter Keyworth
(74) *Attorney, Agent, or Firm* — Proi Intellectual Property US

(57) ABSTRACT

The present disclosure provides a polyzirconium coagulant obtained by performing a controllable hydrolytic polymerization reaction on a simple zirconium salt. The polyzirconium coagulant has a good coagulation performance when removing turbidity, organic matter, phosphate, and fluoride from water body. The coagulation effluent has a low concentration of residual metal and a mild change of pH. At the same dose, compared with a simple zirconium salt and polymerized zirconium chloride with a low polymerization degree, the polyzirconium coagulant prepared by the present disclosure has a wider workable pH and dose range. Besides, compared with other metal salt coagulants, the coagulant prepared by the present disclosure has a better decontamination performance. In addition, by using the polyzirconium coagulant prepared by the present disclosure, the floc has a (Continued)

large size and is rapid to settle. The residual zirconium concentration is low, and pollutant removal efficiency is high.

7 Claims, 3 Drawing Sheets

(51) Int. Cl.
  *C02F 101/14* (2006.01)
  *C02F 101/30* (2006.01)

(56) References Cited

FOREIGN PATENT DOCUMENTS

| | | |
|---|---|---|
| CN | 112093873 A | 12/2020 |
| JP | 2012210569 A | 11/2012 |

OTHER PUBLICATIONS

Jarvis et al. (2012) Comparison of coagulation performance and floc properties using a novel zirconium coagulant against traditional ferric and alum coagulants [J]. Water Research 46, 4179 4187.

Aftab and Hur (2017) Fast tracking the molecular weight changes of humic substances in coagulation/flocculation processes via fluorescence EEM PARAFAC [J]. Chemosphere 178, 317 324.

Ly et al. (2019) Using fluorescence surrogates to track algogenic dissolved organic matter (AOM) during growth and coagulation/flocculation processes of green algae[J]. Journal of Environmental Sciences 79, 311 320.

Christensen et al. (2016) Zirconium and chitosan coagulants for drinking water treatment—a pilot study[J]. Journal of Water Supply: Research and Technology—Aqua 65(8), 635 644.

Ren Hongwei et al. (2016) Preparation and flocculation performance of polymeric zirconium salt flocculants [J]. Contemporary Chemical Industry Research, 2016(10), 102 103.

Gan et al. (2019) Coagulation removal of fluoride by zirconium tetrachloride: performance evaluation and mechanism analysis. Chemosphere 218, 860 868.

Gan et al. (2022) Basicity of titanium based coagulants matters in the treatment of low turbidity water[J]. Separation and Purification Technology 281, 119989.

Wang et al. (2016) Preparation and evaluation of titanium based xerogel as a promising coagulant for water/wastewater treatment[J] Environmental Science & Technology 50, 9619 9626.

Gan et al. (2021) The suitability of titanium salts in coagulation removal of micropollutants and in alleviation of membrane fouling[J]. Water Research 205: 117692.

\* cited by examiner

POLYZIRCONIUM COAGULANT AND APPLICATION THEREOF

TECHNICAL FIELD

The present disclosure relates to the technical field of water treatment, particularly to a solid polyzirconium coagulant and application thereof.

BACKGROUND ART

Coagulation is an important physicochemical treatment technology in water treatment and can effectively remove suspended particulate matter and macromolecular organic matter in water. Throughout the coagulation process, coagulant is a core factor determining removal efficiency of contaminants. Common coagulants include aluminum salt and iron salt coagulants, e.g. polyaluminium chloride (PAC) and polyferric sulfate (PFS), which are widely applied in drinking water treatment and sewage/wastewater treatment. However, the aluminum salt and iron salt coagulants have a lot of disadvantages in application. The aluminum salt coagulant has a narrow workable pH range, poor coagulation performance at low temperatures, toxicity brought by a high concentration of residual aluminum and the like. The iron salt coagulants have strong corrosivity and acidity, and residual iron can result in a certain chroma and smell, and can bring adverse effect on subsequent treatment units. In order to overcome the shortages of traditional aluminum and iron salts, it is a hotspot to develop a novel alternative coagulant.

Compared with traditional metal salt coagulants, zirconium salt coagulant has received attentions due to advantages of high hydrolysis rate, little residual metal, high removal efficiency on micromolecular pollutants and the like. In 1976, $ZrClO_2$ was used as a coagulant for treating papermaking wastewater for the first time to remove micromolecular pollutants in a targeted manner (American U.S. Pat. No. 4,066,542). Subsequently, the zirconium salt coagulant presents a better coagulation performance in purifying a natural water body. $ZrCl_4$ and $ZrClO_2$ have stronger removal capacities for organic matter, arsenate, and fluoride (Lakshmanan et al. (2008) Arsenic removal by coagulation with aluminum, iron, titanium, and zirconium [J]. *Journal-American Water Works Association* 100, 76-88; Jarvis et al. (2012) Comparison of coagulation performance and floc properties using a novel zirconium coagulant against traditional ferric and alum coagulants [J]. *Water Research* 46, 4179-4187; Aftab and Hur (2017) Fast tracking the molecular weight changes of humic substances in coagulation/flocculation processes via fluorescence EEM-PARAFAC [J]. *Chemosphere* 178, 317-324; Ly et al. (2019) Using fluorescence surrogates to track algogenic dissolved organic matter (AOM) during growth and coagulation/flocculation processes of green algae [J]. *Journal of Environmental Sciences* 79, 311-320). Compound use of a simple zirconium salt, zirconium chloride, and chitosan has been used for a water supply treatment of nearly 50,000 residents in Norway (Christensen et al. (2016) Zirconium and chitosan coagulants for drinking water treatment-a pilot study [J]. *Journal of Water Supply: Research and Technology—AQUA* 65(8), 635-644).

The simple zirconium salt coagulant has an inherent defect that the coagulation effluent has a too low pH value. Some scholars tried to improve the coagulation performance of the zirconium salt by improving the polymerization degree. Improving the polymerization degree can improve the coagulation performance: the influence of coexisting substances in water on a coagulation process is reduced, and the pH change of the coagulation effluent is small. A liquid polyzirconium coagulant, namely poly zirconium chloride (PZC) and poly zirconium oxychloride (PZOC), can be prepared by a simple alkali polymerization method (Re Hongwei et al. Research on preparation of poly zirconium salt flocculant and flocculation performance [J]. *Modern Chemical Research* 2016(10), 102-103; Sheng Guoping et al. Preparation method and application of poly zirconium tetrachloride inorganic polymer coagulant [P]. CN107151030A, 2017). The polymerization process can raise the pH value of the coagulation effluent and a turbidity-removing performance during the coagulation is improved. However, since the hydrolysis rate of zirconium salts is high, the forced alkali polymerization method is still difficult to effectively increase the polymerization degree of the zirconium salt, the pH of the coagulation effluent is still at a low level (pH<3.0, strongly acidic), and the coagulation process is susceptible to fluctuation of water quality. During application, when a dose is high or a water sample has a weak buffering capacity, pH of the water sample will be rapidly reduced, and a certain alkali liquor needs to be added to adjust the pH value to a pH range for flocculation.

The influence of coexisting substance in water on a coagulation process can be reduced by improving a polymerization degree to overcome the defects. Besides, the pH value of the coagulation effluent is reduced more gradually, such that the coagulation performance is improved. Chinese patent 201711390381.9 discloses a method for preparing an inorganic polymer flocculant of poly silicic acid and poly zirconium chloride. In a technical solution, a poly zirconium chloride liquid is firstly synthesized by an alkali polymerization method and then a certain amount of the poly silicic acid is mixed with the poly zirconium chloride liquid to obtain the poly silicic acid and poly zirconium chloride liquid flocculant. However, the polymerization degree of the zirconium salt cannot be further increased even by a silicic acid copolymerization method. An alkalization degree of the material in the patent is only 2.0 at the maximum and the material is in an unstable liquid state. Therefore, preparation of polyzirconium coagulants with high polymerization degrees is a technical problem for researchers in the field of water treatment to further develop and utilize zirconium salt coagulants.

SUMMARY OF THE DISCLOSURE

Aiming at the above problems, the present disclosure provides a polyzirconium coagulant and application thereof. The method has a good repeatability and is easy for quantitative production. The polyzirconium coagulant fundamentally overcomes inherent defects of low polymerization degree, too low pH value of coagulation effluent, and low stability of zirconium salt coagulants, and can be widely applied in removing turbidity, organic matter, phosphate, and fluoride in water supply and wastewater. The polyzirconium coagulant has an excellent coagulation performance, such as a low residual metal concentration and a high precipitation rate.

The objective of the present disclosure is achieved as follows:

Firstly, the present application provides a polyzirconium coagulant, obtained by the following method:
  a) dispersing a simple zirconium salt into ethanol I, mixing same evenly, and adding acetylacetone to obtain a solution A for later use, wherein the simple zirconium salt, the ethanol I, and the acetylacetone have a molar ratio of 1:(0-12):(0.03-1);

b) mixing ethanol IL, deionized water, and hydrochloric acid to obtain a solution B for later use,
wherein the simple zirconium salt (step a), the ethanol IL, the deionized water, and the hydrochloric acid have a molar ratio of 1:(0-6):(0-8):(0-4);

c) adding the solution B into the solution A to obtain a mixed solution; and d) drying the mixed solution in a spraying manner at 80-120° C. or a rotary evaporation manner at 60-80° C. to a constant weight to obtain the polyzirconium coagulant.

Further, in the present disclosure, the simple zirconium salt includes at least one of zirconium chloride, zirconium oxychloride, zirconium isopropoxide, and zirconium n-butanol.

Secondly, the present disclosure further provides application of the above polyzirconium coagulant in removing turbidity and an organic matter in a water body. A specific treatment method is as follows: adjusting a pH of a water sample to be treated to 3-10 using hydrochloric acid or sodium hydroxide and adding the polyzirconium coagulant into the water body at a dose of 3-100 mg/L to remove the turbidity and the organic matter in the water body.

Thirdly, the present disclosure further provides application of the above polyzirconium coagulant in removing a phosphate and a fluoride in a water body. A specific treatment method is as follows: adjusting a pH of a water sample to be treated to 3-6 and adding the polyzirconium coagulant at a dose of 20-100 mg/L to remove the phosphate and the fluoride in the water body.

Fourthly, the present disclosure further provides application of the above polyzirconium coagulant in improving a flux of an ultrafiltration membrane (any conventional ultrafiltration membrane in the field). A specific treatment method is as follows: adjusting a pH of a water sample to be treated to 3-6, adding the polyzirconium coagulant into the water to be treated at a dose of 20-100 mg/L, and combining the polyzirconium coagulant with an ultrafiltration membrane unit to improve the flux of the membrane or reduce a transmembrane pressure.

Compared with the existing polyzirconium coagulants, the polyzirconium coagulant prepared by the present application has the following beneficial effects:

(1) The polyzirconium coagulant of the present disclosure is prepared from a simple zirconium salt, a chelating agent, hydrochloric acid, and ethanol as raw materials under a mild condition to finally obtain a material, a stable solid. The whole preparation process is simple to operate and easy to control. Compared with a traditional liquid coagulant or a polyaluminium and polyferric solid coagulant, the solid polyzirconium coagulant prepared by the present application has a higher mass fraction of a metal.

(2) The polyzirconium coagulant prepared by the present disclosure fundamentally overcomes an inherent defect of using the simple zirconium salt as the coagulant. The obtained material has a high polymerization degree, a coagulation effluent has a small change of pH, and a residual metal zirconium has a low concentration.

(3) The polyzirconium coagulant prepared by the present disclosure has an excellent floc characteristic. The polyzirconium coagulant prepared by the method can be applied in different water treatments, has higher removal rates on turbidity, an organic matter, a phosphate and the like under the same dose, and can effectively improve an anti-pollution performance of an ultrafiltration membrane.

DETAILED DESCRIPTION OF THE DISCLOSURE

The present disclosure is further described below with reference to the examples. It should be noted that the scope of protection of the present disclosure is not limited to what is disclosed in the following examples.

The reagents related in the examples are commercially available unless otherwise specified.

Example 1 Preparation and Characterization of Polyzirconium Coagulant

Figure 1:
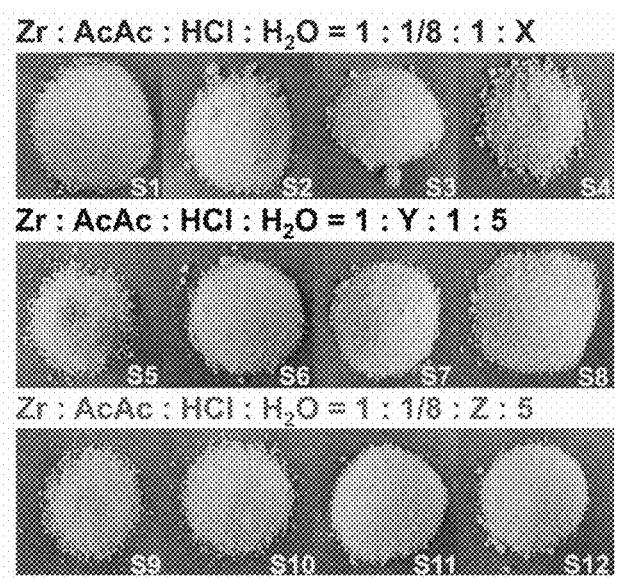
FIG. 1 schematically shows solid materials of polyzirconium coagulants prepared in Example 1.

Zirconium isopropoxide is used as a zirconium source. A specific preparation process of a polyzirconium coagulant is as follows:

a) 5 mL of zirconium isopropoxide was dispersed into 20 mL of ethanol I, the materials were mixed evenly, and 0.061-0.488 mL of acetylacetone was added to obtain a solution A for later use;

b) 5 mL of ethanol IL, 0.10-0.79 mL of deionized water, and 0.6-1.0 mL of hydrochloric acid with a mass fraction of 37% were mixed to obtain a solution B for later use;

c) the solution B was added into the solution A to obtain a mixed solution; and d) the mixed solution was dried in a rotary evaporation manner at 60-80° C. to a constant weight to obtain the polyzirconium coagulant. FIG. 1 is photographs of several polyzirconium coagulants S1-S12 obtained in the example.

A mass percentage of zirconium in the polyzirconium coagulants S1-S12 prepared from the solution A and the solution B at different ratios was detected. The results were shown in Table 1:

TABLE 1

Synthesized polyzirconium coagulant under different raw material ratios

| | Solution A (mL) | | | Solution B (mL) | | | Molar ratio (mol/mol) | | |
|---|---|---|---|---|---|---|---|---|---|
| Number | Zr | AA | Ethanol I | HCl | $H_2O$ | Ethanol II | AA/Zr | HCl/Zr | $H_2O$/Zr |
| S1 | 5 | 0.122 | 20 | 0.8 | 0.10 | 5 | 1:8 | 1:1 | 4 |
| S2 | 5 | 0.122 | 20 | 0.8 | 0.27 | 5 | 1:8 | 1:1 | 5 |
| S3 | 5 | 0.122 | 20 | 0.8 | 0.45 | 5 | 1:8 | 1:1 | 6 |
| S4 | 5 | 0.122 | 20 | 0.8 | 0.79 | 5 | 1:8 | 1:1 | 8 |
| S5 | 5 | 0.061 | 20 | 0.8 | 0.27 | 5 | 1:16 | 1:1 | 5 |

TABLE 1-continued

Synthesized polyzirconium coagulant under different raw material ratios

| Number | Solution A (mL) | | | Solution B (mL) | | | Molar ratio (mol/mol) | | |
|---|---|---|---|---|---|---|---|---|---|
| | Zr | AA | Ethanol I | HCl | H$_2$O | Ethanol II | AA/Zr | HCl/Zr | H$_2$O/Zr |
| S6  | 5 | 0.122 | 20 | 0.8 | 0.27 | 5 | 1:8 | 1:1 | 5 |
| S7  | 5 | 0.244 | 20 | 0.8 | 0.27 | 5 | 1:4 | 1:1 | 5 |
| S8  | 5 | 0.488 | 20 | 0.8 | 0.27 | 5 | 1:2 | 1:1 | 5 |
| S9  | 5 | 0.122 | 20 | 0.4 | 0.57 | 5 | 1:8 | 1:2 | 5 |
| S10 | 5 | 0.122 | 20 | 0.6 | 0.41 | 5 | 1:8 | 3:4 | 5 |
| S11 | 5 | 0.122 | 20 | 0.8 | 0.27 | 5 | 1:8 | 1:1 | 5 |
| S12 | 5 | 0.122 | 20 | 1.0 | 0.11 | 5 | 1:8 | 5:4 | 5 |

As shown in Table 1, the solid polyzirconium coagulants can be obtained under different raw material ratios. Zirconium in the polyzirconium coagulants was measured by an inductively coupled plasma-atomic emission spectrometer (ICP-AES). The zirconium contents were all at a higher level of 34.7%-38.8%.

With reference to Polyaluminium Chloride for Treatment of Drinking Water (GB 15892-2020), a basicity of the polyzirconium coagulant was determined to be 77% and converted into an alkalinity of 3.08, which was much higher than 0.5-2.0 in Chinese patent 201711390381.9. The results indicated that the zirconium salt prepared by the present example has a higher polymerization degree, such that the zirconium salt has a better performance of removing turbidity during the coagulation. Besides, a pH change of the coagulation effluent is small.

Example 2 Application of Polyzirconium Coagulant in Removing Turbidity

In the example, a water sample with a kaolin-simulated turbidity was prepared as follows: 100 mg of kaolin was added into 5 L of running water to be fully stirred and used, the turbidity of the water sample was 21.7 NTU, and a pH value was about 7.8-8.0.

A coagulant was added into the water sample and slowly stirred for 15 min, further precipitation was performed for 20 min, and a supernatant was taken to determine related indicators. S2 in Example 1 was taken as the polyzirconium coagulant and abbreviated as ZXC. Compared with a simple zirconium salt ZrCl$_4$ and poly zirconium chloride PZC synthesized by an alkali polymerization method (a preparation method of the PZC in the present application referred to a method disclosed in patent CN107151030A, 2017), performances of the ZXC prepared by the present disclosure at different doses and pH values were investigated for removing turbidity. Main detection indicators include a residual turbidity, a pH value of a coagulation effluent and a residual zirconium concentration (Gan et al. (2019) Coagulation removal of fluoride by zirconium tetrachloride: performance evaluation and mechanism analysis. *Chemosphere* 218, 860-868).

Figure 2:
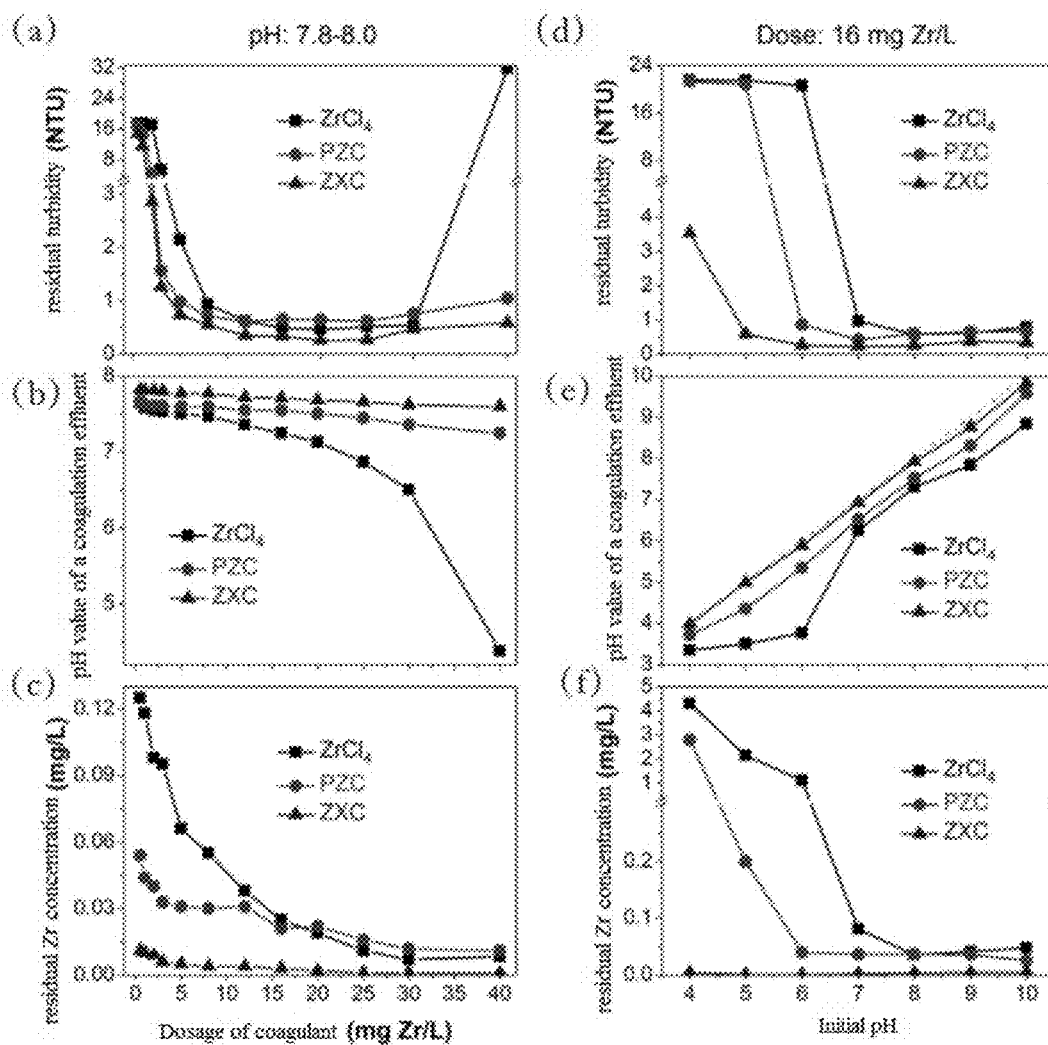
FIG. 2 schematically shows the treatment effect of the polyzirconium coagulant in Example 2 on a water sample with a simulated turbidity.

As shown in FIG. 2, (a)-(c) in FIG. 2 were respectively the residual turbidity of the effluent, the pH of the effluent, and the residual zirconium concentration when coagulation doses of ZXC, ZrCl$_4$, and PZC were different; and (d)-(f) were respectively the residual turbidity of the effluent, the pH of the effluent, and the residual zirconium concentration of ZXC, ZrCl$_4$, and PZC at different initial pH values.

It can be seen that compared with other zirconium salt coagulants, the polyzirconium coagulant S2 has a more outstanding coagulation effect in a wider pH and dose range, as shown by a lower residual turbidity, a small pH change of the coagulation effluent, and an extremely low concentration of the residual metal zirconium in the effluent, confirming high efficiency of the polyzirconium coagulant prepared by the present disclosure in removing the turbidity.

Example 3 Application of Polyzirconium Coagulant in Removing Phosphate

A simulated water sample containing phosphorus was prepared in a laboratory: 5 mL of an orthophosphate stock solution (5 g P/L) was added into 5 L of running water, a pH was adjusted to 5.0 using HCl, and an initial phosphorus concentration was 5 mg/L. S2 in Example 1 was studied as the polyzirconium coagulant (ZXC) in comparison with a traditional polyaluminium/polyferric coagulant and a novel polytitanium coagulant, including polyaluminium chloride (PAC), polyferric sulfate (PFS), and a titanium xerogel coagulant (TXC) (PAC and PFS were provided by Shenzhen Zhongrun Water Industry Co., Ltd.; and TXC was synthesized based on the literature: Gan et al. (2022) Basicity of titanium-based coagulants matters in the treatment of low-turbidity water [J]. *Separation and Purfication Technology* 281, 119989). A phosphate concentration was measured by a molybdenum-antimony anti-spectrophotometric method. A residual metal concentration was measured by an inductively coupled plasma-atomic emission spectrometer (Wang et al. (2016) Preparation and evaluation of titanium-based xerogel as a promising coagulant for water/wastewater treatment [J]. *Environmental Science & Technology* 50, 9619-9626).

Figure 3:
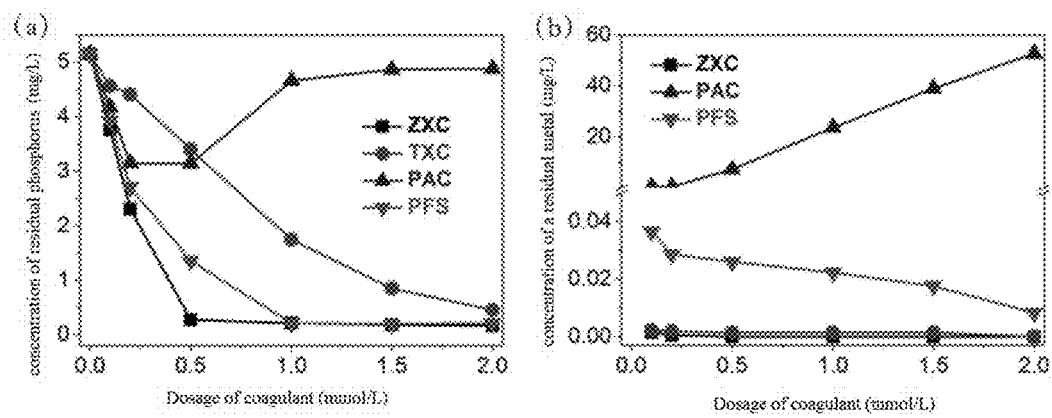
FIG. 3 schematically shows the treatment effect of the polyzirconium coagulant in Example 3 on a simulated water sample containing phosphorus.

The detection results were shown in FIG. 3. In FIG. 3, (a) shows detection results of a concentration of residual phosphorus in an effluent after different coagulants were added; and (b) shows detection results of a concentration of a residual metal in an effluent after different coagulants were added. As can be seen from FIG. 3, the polyzirconium coagulant S2 showed a better performance of removing phosphorus and the concentration of the residual metal in the coagulation effluent was lower, which indicated that the polyzirconium coagulant prepared by the present application had an application potential in removing a phosphate.

Example 4 Application of Polyzirconium Coagulant in Removing Fluoride

A simulated water sample containing fluorine was prepared in a laboratory: 44 mg of sodium fluoride was added into about 4 L of running water, a pH was adjusted to an acidic pH (4.0, 5.0, and 6.0) with HCl, a supernatant was taken after a coagulation stirring-precipitation procedure, a fluorine concentration of an effluent was measured using a fluorine ion selective electrode, and an initial fluorine concentration was 5.38 mg/L. S2 in Example 1 was studied as the polyzirconium coagulant (ZXC) in comparison with a traditional polyaluminium/polyferric coagulant and a novel polytitanium coagulant, including polyaluminium chloride (PAC), polyferric sulfate (PFS), and a titanium xerogel coagulant (TXC).

Figure 4:
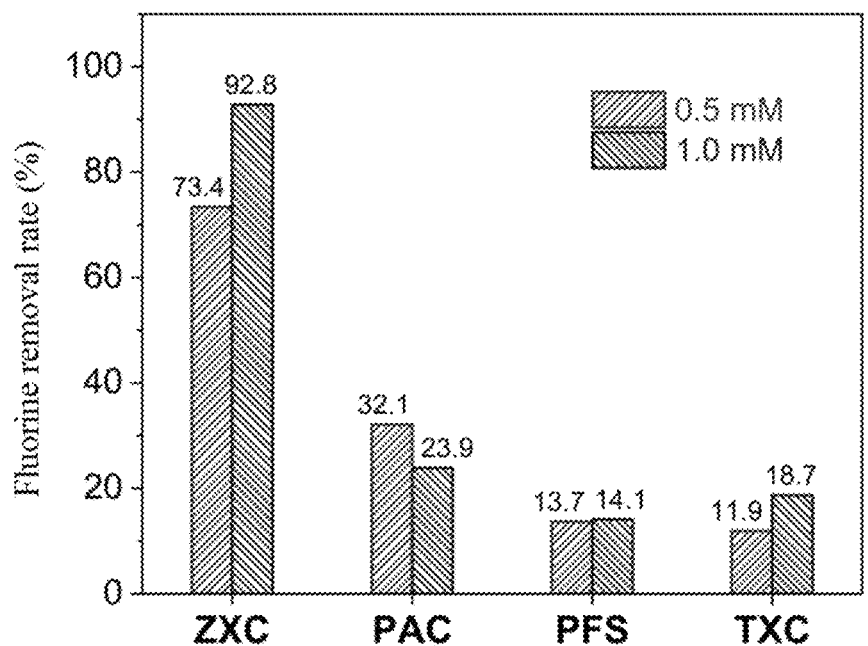
FIG. 4 schematically shows the treatment effect of the polyzirconium coagulant in Example 4 on a simulated water sample containing fluorine.

The detection results were shown in FIG. 4. It can be seen that the polyzirconium coagulant S2 showed a better performance of removing fluorine and a floc was rapid to settle in a coagulation process. When an initial pH was 4.0-6.0, 0.5 mM of the polyzirconium coagulant of the present disclosure was added, the fluoride in raw water can be respectively reduced from 5.38 mg/L to 1.43 mg/L, 0.96 mg/L, and 0.64 mg/L. When the initial pH value was 6.0, 0.5-1.0 mM of the added ZXC had higher efficiency of removing fluorine than TXC, PAC, and PFS. The results all showed that the polyzirconium coagulant prepared by the method had an application potential in removing fluorine.

Example 5 Application of Polyzirconium Coagulant in Reducing Pollution of Ultrafiltration Membrane A simulated organic wastewater was prepared in a laboratory: 5 mL of an orthophosphate stock solution (5 g P/L) and 50 mg of sodium humate were added into 5 L of running water, a pH was adjusted to 5.0 using HCl, an initial phosphorus concentration was 5 mg/L, an initial turbidity was 4.8 NTU, and $UV_{254}$ was 0.162. A constant-pressure filtration was performed in an ultrafiltration process, a high-purity nitrogen bottle provided a constant pressure of 0.1 MPa, a disc-shaped ultrafiltration membrane (Microdyn Nadir (Xiamen) GmbH, UB50, 50 kDa) was arranged in an ultrafiltration cup in a dead-end filtration mode, an effluent with flocs after coagulation was poured into the ultrafiltration cup for filtration, a volume change of the effluent was recorded, and a change of a membrane flux was thus calculated (Gan et al. (2021) The suitability of titanium salts in coagulation removal of micropollutants and in alleviation of membrane fouling [J]. *Water Research* 205: 117692).

Figure 5:
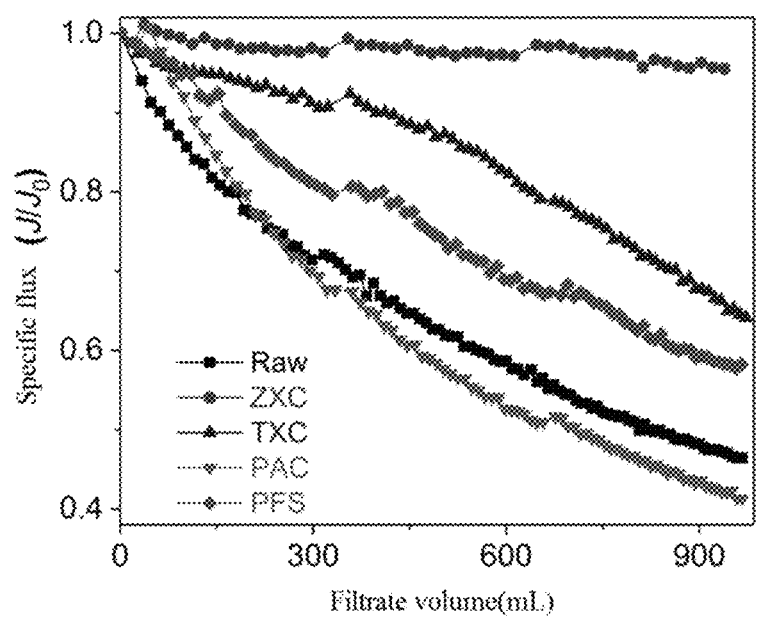
FIG. 5 schematically shows the treatment effect of the polyzirconium coagulant in Example 5 in pre-coagulation on reducing pollution of an ultrafiltration membrane.

As a main technology of a pre-membrane pretreatment, coagulation can reduce pollution of an ultrafiltration membrane by reducing pollutants. As shown in FIG. 5, the polyzirconium coagulant prepared by the present disclosure can effectively improve the flux of the ultrafiltration membrane and is more suitable for being combined with an ultrafiltration technology compared with the traditional polyaluminium/polyferric coagulant and the novel polytitanium coagulant. As the main technology of the pre-membrane pretreatment, the coagulation improves use efficiency of the ultrafiltration membrane by reducing pollutants. This can be attributed to that the polyzirconium coagulant has a better efficiency of removing an organic matter, a superior floc characteristic, and a lower metal residue.

The above examples are merely several implementations of the present disclosure. Although the description is specific and detailed, it should not be construed as a limitation to the patent scope of the present disclosure. It should be noted that those skilled in the art can further make several improvements without departing from the conception of the present disclosure. These improvements all fall within the protection scope of the present disclosure.

The invention claimed is:

1. A solid polyzirconium coagulant, obtained by the following method:
   a) mixing a simple zirconium salt, ethanol I, and acetylacetone to obtain a solution A for later use,
   wherein the simple zirconium salt, the ethanol I, and the acetylacetone have a molar ratio of 1:(0-12):(0.03-1);
   b) mixing ethanol II, deionized water, and hydrochloric acid to obtain a solution B for later use,
   wherein the simple zirconium salt, the ethanol II, the deionized water, and the hydrochloric acid have a molar ratio of 1:(0-6):(0-8):(0-4); and
   c) adding the solution B into the solution A to obtain a mixed solution and drying the mixed solution to obtain the solid polyzirconium coagulant.

2. The solid polyzirconium coagulant according to claim 1, wherein the simple zirconium salt comprises at least one of zirconium chloride, zirconium oxychloride, zirconium isopropoxide, and zirconium n-butanol.

3. The solid polyzirconium coagulant according to claim 1, wherein the drying is performed in a spraying manner at 80-120° C. or a rotary evaporation manner at 60-80° C.

4. The solid polyzirconium coagulant according to claim 1, wherein in the step (b), the simple zirconium salt and the hydrochloric acid have a molar ratio of 1:(0.5-4).

5. Application of the solid polyzirconium coagulant according to claim 1 in removing turbidity and an organic matter in a water body, comprising the steps of:
   adjusting a pH of the water body to 3-10; and
   adding the solid polyzirconium coagulant into the water body at a dose of 3-100 mg/L.

6. Application of the solid polyzirconium coagulant according to claim 1 in removing a phosphate and a fluoride in a water body, comprising the steps of:
   adjusting a pH of the water body to 3-6; and
   adding the solid polyzirconium coagulant into the water body at a dose of 20-100 mg/L.

7. Application of the solid polyzirconium coagulant according to claim 1 in improving a flux of an ultrafiltration membrane, comprising the steps of:
   adjusting a pH of a water body to 3-6;
   adding the solid polyzirconium coagulant into the water body at a dose of 20-100 mg/L; and
   combining the solid polyzirconium coagulant with the ultrafiltration membrane.

* * * * *